US011252071B2

(12) United States Patent
Jones et al.

(10) Patent No.: US 11,252,071 B2
(45) Date of Patent: Feb. 15, 2022

(54) SANDBOX ENVIRONMENT FOR TESTING INTEGRATION BETWEEN A CONTENT PROVIDER ORIGIN AND A CONTENT DELIVERY NETWORK

(71) Applicant: Akamai Technologies, Inc., Cambridge, MA (US)

(72) Inventors: Bradford A. Jones, Natick, MA (US); Manish Gupta, Melrose, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 16/556,705

(22) Filed: Aug. 30, 2019

(65) Prior Publication Data

US 2020/0162360 A1  May 21, 2020

Related U.S. Application Data

(63) Continuation of application No. 15/907,881, filed on Feb. 28, 2018, now Pat. No. 10,439,925.

(Continued)

(51) Int. Cl.
*H04L 29/06* (2006.01)
*H04L 12/26* (2006.01)
(Continued)

(52) U.S. Cl.
CPC .......... *H04L 43/50* (2013.01); *H04L 12/4633* (2013.01); *H04L 41/08* (2013.01); *H04L 63/02* (2013.01); *H04L 67/32* (2013.01)

(58) Field of Classification Search
CPC ..... H04L 43/50; H04L 67/2852; H04L 67/02; G06F 11/3672; G06F 9/5072;
(Continued)

(56) References Cited

U.S. PATENT DOCUMENTS 4,419,751 A * 12/1983 Cholat-Namy ......... H04L 43/50
370/241
7,216,164 B1 * 5/2007 Whitmore ........... H04L 41/5009
709/223

(Continued)

FOREIGN PATENT DOCUMENTS

AU    2002239833 B2 * 5/2007 ......... H04L 65/4092
AU    2011268104 A1 * 5/2013 ............. G06Q 50/00
(Continued)

OTHER PUBLICATIONS

Baeldung, "forward", "redirect", 2021 (Year: 2021).*
(Continued)

*Primary Examiner* — Ondrej C Vostal

(57) ABSTRACT

This document describes systems, devices, and methods for testing the integration of a content provider's origin infrastructure with a content delivery network (CDN). In embodiments, the teachings hereof enable a content provider's developer to rapidly and flexibly create test environments that send test traffic through the same CDN hardware and software that handle (or at least have the ability to handle) production traffic, but in isolation from that production traffic and from each other. Furthermore, in embodiments, the teachings hereof enable the content provider to specify an arbitrary test origin behind its corporate firewall with which the CDN should communicate.

14 Claims, 10 Drawing Sheets

Related U.S. Application Data

(60) Provisional application No. 62/629,848, filed on Feb. 13, 2018, provisional application No. 62/608,907, filed on Dec. 21, 2017.

(51) Int. Cl.
*H04L 29/08* (2006.01)
*H04L 12/24* (2006.01)
*H04L 12/46* (2006.01)

(58) Field of Classification Search
CPC .. G06F 11/3612; G06F 9/547; G06F 11/3684; G06F 11/3664; G06Q 50/00
USPC .......................................................... 709/223
See application file for complete search history.

(56) References Cited

U.S. PATENT DOCUMENTS

| | | | | |
|---|---|---|---|---|
| 7,406,627 | B2 * | 7/2008 | Bailey | H04L 41/145 714/38.1 |
| 7,421,621 | B1 * | 9/2008 | Zambrana | G06F 11/3612 714/38.14 |
| 7,673,048 | B1 * | 3/2010 | O'Toole, Jr. | H04L 12/66 709/226 |
| 8,239,530 | B2 * | 8/2012 | Sundaram | H04L 41/046 709/224 |
| 8,392,912 | B2 * | 3/2013 | Davis | H04L 63/0227 717/177 |
| 8,478,883 | B2 * | 7/2013 | Day | G06Q 20/401 709/227 |
| 8,819,187 | B1 * | 8/2014 | Hofmann | H04L 67/2814 709/219 |
| 9,137,131 | B1 * | 9/2015 | Sarukkai | H04L 67/42 |
| 9,384,074 | B1 * | 7/2016 | Peterson | G06F 9/547 |
| 9,609,042 | B1 * | 3/2017 | Pallemulle | H04L 67/02 |
| 9,729,605 | B2 * | 8/2017 | Gero | H04L 67/2842 |
| 9,736,271 | B2 * | 8/2017 | Stevens | H04L 67/2814 |
| 9,819,721 | B2 * | 11/2017 | Bendell | G06F 16/9574 |
| 9,843,624 | B1 * | 12/2017 | Taaghol | H04L 41/0803 |
| 9,858,174 | B2 * | 1/2018 | Straub | G06F 8/61 |
| 9,912,553 | B1 * | 3/2018 | Grebenschikov | H04L 67/10 |
| 10,439,925 | B2 | 10/2019 | Jones et al. | |
| 10,747,881 | B1 * | 8/2020 | Luo | H04L 63/1491 |
| 2001/0012986 | A1 * | 8/2001 | Conan | G06F 11/3688 702/188 |
| 2002/0052942 | A1 * | 5/2002 | Swildens | H04L 67/06 709/223 |
| 2003/0041094 | A1 * | 2/2003 | Lara | G06F 11/0709 709/201 |
| 2003/0093479 | A1 * | 5/2003 | Mellen-Garnett | G06F 9/54 709/205 |
| 2004/0093419 | A1 * | 5/2004 | Weihl | H04L 63/06 709/229 |
| 2005/0021276 | A1 * | 1/2005 | Southam | H04L 43/50 702/122 |
| 2006/0037016 | A1 * | 2/2006 | Saha | G06F 9/5061 717/178 |
| 2008/0222281 | A1 * | 9/2008 | Dilley | H04L 67/2819 709/223 |
| 2008/0282112 | A1 * | 11/2008 | Bailey | H04L 43/50 714/38.11 |
| 2009/0307763 | A1 * | 12/2009 | Rawlins | G06F 11/3672 726/5 |
| 2011/0029902 | A1 * | 2/2011 | Bailey | G06Q 30/0277 715/764 |
| 2011/0126168 | A1 * | 5/2011 | Ilyayev | G06F 9/5072 717/103 |
| 2012/0096106 | A1 * | 4/2012 | Blumofe | G06Q 50/00 709/213 |
| 2013/0073609 | A1 * | 3/2013 | Connolly | G06F 16/9574 709/203 |
| 2013/0332624 | A1 * | 12/2013 | Chewter | H04L 43/50 709/238 |
| 2014/0026122 | A1 * | 1/2014 | Markande | G06F 11/3688 717/124 |
| 2014/0164584 | A1 * | 6/2014 | Joe | H04L 61/1511 709/223 |
| 2014/0215620 | A1 * | 7/2014 | Hayrynen | G06F 21/56 726/23 |
| 2014/0304406 | A1 * | 10/2014 | Baumback | H04L 43/0811 709/224 |
| 2015/0150123 | A1 * | 5/2015 | Be'ery | H04L 63/1458 726/22 |
| 2015/0180743 | A1 * | 6/2015 | Jana | G06F 3/04842 715/736 |
| 2015/0281331 | A1 * | 10/2015 | Steiner | H04L 67/1002 709/203 |
| 2016/0050108 | A1 * | 2/2016 | Baughman | G06F 11/3457 709/220 |
| 2016/0277476 | A1 * | 9/2016 | Pawlik | H04L 51/10 |
| 2016/0335447 | A1 * | 11/2016 | Guo | G06F 21/602 |
| 2017/0104840 | A1 * | 4/2017 | Spagnola | H04L 67/2852 |
| 2017/0126538 | A1 * | 5/2017 | Wistow | H04L 67/34 |
| 2017/0317910 | A1 * | 11/2017 | Deng | H04L 43/10 |
| 2018/0027006 | A1 * | 1/2018 | Zimmermann | H04L 63/0245 726/11 |
| 2018/0069702 | A1 * | 3/2018 | Ayyadevara | H04W 12/0609 |
| 2018/0081642 | A1 * | 3/2018 | Alurralde Iturri | G06F 8/38 |
| 2019/0065352 | A1 * | 2/2019 | Patel | G06F 11/3688 |

FOREIGN PATENT DOCUMENTS

| | | | | |
|---|---|---|---|---|
| EP | 1533970 | B1 * | 8/2006 | ......... H04L 61/1511 |
| EP | 2207321 | A1 * | 7/2010 | ......... H04L 12/4633 |
| WO | WO-2016145753 | A1 * | 9/2016 | ......... H04W 72/1252 |

OTHER PUBLICATIONS

Chen, "Applying Aggregate-Level Traffic Control Algorithms to Improve Network Robustness", 2004 (Year: 2004).*
Lan, "A Framework for Network Function Virtualization", 2016 (Year: 2016).*
Microsoft Dictionary, "persistent connection", 5th edition, 2002 (Year: 2002).*
Varnish Software, "session persistence", 2021 (Year: 2021).*
WhatIs.com, "What is persistent connection (HTTP persistent connection)", 2016 (Year: 2016).*
Baelduing, "forward", "redirect", 2021 (Year: 2021).*
CDNetwork, "What is origin server?", 2021 (Year: 2021).*
Ives, "Computer Software Quality Assurance", 1986 (Year: 1986).*
Sneed, "Automated Tool Support for ANSI/IEEE STD: 829-1983 Software Test Documentation", 1993 (Year: 1993).*
Communication Under MPEP § 609.02, filed Sep. 3, 2019 in this case, 2 pages.
U.S. Appl. No. 15/907,881, parent case, filed Feb. 28, 2018.
"Application Edge Platform | section.io", downloaded from Wayback Machine https://web.archive.org/web/20171017072718/https://www.section.io/, with date of Oct. 17, 2017, 8 pages.
"Overview :: Section Documentation", available at https://www.section.io/docs/developer-workflow/overview/ (downloaded Feb. 6, 2020), 1 page.
"Previewing and testing VCL | Fastly VCL Documentation", Wayback Machine archive of Dec. 2018, page showing last updated in Aug. 2018, downloaded fon Feb. 7, 2020 from https://web.archive.org/web/20181220202813/https://docs.fastly.com/vcl/custom-vcl/previewing-and-testing-vcl/.
Cloudflare, , "Introducing Cloudflare Warp: Hide Behind The Edge", Sep. 28, 2017, https://blog.cloudflare.com/introducing-cloudflare-warp/ (downloaded Feb. 6, 2020), 10 pages.
Fastly, "Previewing and testing VCL", last updated Feb. 21, 2019, available at https://docs.fastly.com/vcl/custom-vcl/previewing-and-testing-vcl/( downloaded Feb. 6, 2020).
Section,"Developer PoP—Edge Compute DevOps | Section", 9 pages, downloaded Feb. 6, 2020 from https://www.section.io/developer-pop/.
Counterpart EU Application 18213008.8, First Exam Report dated Jul. 9, 2020, 10 pages.

(56) References Cited

OTHER PUBLICATIONS

Counterpart EU Patent Application 18213008.8, response to the Extended European Search Report (ESSR) filed Apr. 6, 2020, 14 pages.
Counterpart European Patent Application No. 18 213008.8, response European Exam Report field on Nov. 5, 2020, 4 pages.
Carley, Dan , "CDN acceptance testing for GOV.UK—Technology in government", blog post, downloaded Mar. 17, 2020, at https://technology.blog.gov.uk/2014/10/01/cdn-acceptance-testing/, Oct. 1, 2014, 9 pages.

* cited by examiner

SANDBOX ENVIRONMENT FOR TESTING INTEGRATION BETWEEN A CONTENT PROVIDER ORIGIN AND A CONTENT DELIVERY NETWORK

CROSS REFERENCE TO RELATED APPLICATIONS

This application is a continuation of U.S. application Ser. No. 15/907,881, filed Feb. 28, 2018, which is based on and claims the benefit of priority of U.S. Application No. 62/629,848, filed Feb. 13, 2018, and this application is based on and claims the benefit of priority of U.S. Application No. 62/608,907, filed Dec. 21, 2017, the contents of all of which are hereby incorporated in their entirety.

BACKGROUND

Technical Field

This application relates generally to content delivery networks and to the creation and operation of a test environment to enable a content provider to test integration of their origin infrastructure with the content delivery network.

Brief Description of the Related Art

A "content delivery network" or "CDN" is often operated and managed by a service provider. The service provider typically provides the content delivery service on behalf of third party content providers. A distributed system of this type typically refers to a collection of autonomous computers linked by a network or networks, together with the software, systems, protocols and techniques designed to facilitate various services, such as content delivery or the support of outsourced site infrastructure. The infrastructure is generally used for the storage, caching, or transmission of content—such as web page objects, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN's components may be located at nodes that are publicly-routable on the Internet, within or adjacent nodes that are located in mobile networks, in or adjacent enterprise-based private networks, or in any combination thereof.

In operation, the CDN platform retrieves content from the content provider's origin infrastructure, and delivers it to requesting end-user clients. A CDN typically employs a set of proxy servers, and when a given server in the CDN receives a request for an object (e.g., an HTML document, an image file, scripts, cascading style sheets, videos, XML documents) from an end user client device, it identifies the content as being from the content provider and applies a set of configurations instructions, sometimes referred to herein as 'metadata'. The configuration instructions are usually customized for the particular content provider, i.e., each content provider can independently specify how they want the CDN to handle such requests. In a basic reverse proxy operation, the server may check whether it has a valid copy (i.e., unexpired) of the object in its local cache. If so, it can serve the request from the cache. If not, it can issue a forward request to obtain the content from an origin server. It may check whether the content is in a cache parent (i.e., in a hierarchical caching system) before requesting the content from the origin; or, cache parent may pass the forward request on to the origin if there is another cache miss.

Given these operations, the content provider's origin infrastructure plainly must be integrated with the CDN platform. It is often necessary to conduct extensive testing of the integration before the content provider's website goes live. Further testing is likely necessary when implementing significant changes in the website, or in the origin infrastructure that hosts the website, and/or in the configuration of the CDN.

It is difficult to conduct quality testing of the integration between a content provider's origin infrastructure and a CDN platform.

Ideally, a content provider's test traffic is isolated from its production traffic, and indeed it is desirable to have many isolated test environments (referred to here as 'sandboxes') readily available to a content provider. Preferably the test environment is as similar as possible to an actual production environment, meaning that the test traffic runs through the actual production CDN platform, both hardware and software, albeit with a test CDN configuration applied. Moreover, a content provider likely employs multiple developers and teams. Developers should be able to run tests with the same origin hostname, but with an test origin server and CDN test configuration of the individual developer's (or individual team's) choosing.

Enterprise security layers at the content provider complicate matters. A content provider's development team is almost certainly working on an enterprise LAN behind the corporate firewall. But to test content provider to CDN integration, CDN servers ought to be able to reach the developer's chosen test client and just as important chosen test origin. Developers want flexibility and speed in setting up new tests, but it is not feasible to quickly and repeatedly re-configure the enterprise firewall to allow a CDN server to contact an arbitrary test client and/or test origin.

What is needed is a safe and secure way for developers working on behalf of a content provider to test new origin and CDN configurations, preferably within a production CDN server environment, while still having the ability to quickly and flexibly instantiate new sandboxes that are compatible with the content provider's enterprise security layer.

The teachings hereof address this technical problem. The teachings hereof also provide other benefits and improvements that will become apparent in view of this disclosure.

A general background on CDNs is now provided.

In a known system such as that shown in FIG. 1, a distributed computer system 100 is configured as a content delivery network (CDN) and has a set of computers 102 distributed around the Internet. Typically, most of the computers are configured as servers and located near the edge of the Internet, i.e., at or adjacent end user access networks. A network operations command center (NOCC) 104 may be used to administer and manage operations of the various machines in the system. Third party sites affiliated with content providers, such as web site 106, offload delivery of content (e.g., HTML or other markup language files, embedded page objects, streaming media, software downloads, and the like) to the distributed computer system 100 and, in particular, to the servers (which are sometimes referred to as content servers, or sometimes as "edge" servers in light of the possibility that they are near an "edge" of the Internet). Such servers may be grouped together into a point of presence (POP) 107.

Typically, content providers offload their content delivery by aliasing (e.g., by a DNS CNAME) given content provider domains or sub-domains to domains that are managed by the service provider's authoritative domain name service. End user client devices 122 that desire such content may be directed to the distributed computer system to obtain that content more reliably and efficiently. The CDN servers 102 respond to the client device requests, for example by obtaining requested content from a local cache, from another CDN server 102, from the origin server 106, or other source.

Although not shown in detail in FIG. 1, the distributed computer system may also include other infrastructure, such as a distributed data collection system 108 that collects usage and other data from the CDN servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN, and which acts as a request routing mechanism to direct clients to a selected CDN server 102. A distributed data transport mechanism 120 may be used to distribute control information (sometimes referred to as "metadata") to the CDN servers.

A more detailed description of an embodiment of a CDN server 102 is now provided. A given CDN server can be implemented as a computer that comprises commodity hardware (e.g., a microprocessor with memory holding program instructions) running an operating system kernel (such as Linux® or variant) that supports one or more applications. To facilitate content delivery services, for example, given computers typically run a set of applications, such as an HTTP (web) proxy server, a name service (DNS), a local monitoring process, a distributed data collection process, and the like. The HTTP proxy server (sometimes referred to herein as a HTTP proxy for short) is a kind of web server and it typically includes a manager process for managing a local cache and delivery of content from the machine. For streaming media, the machine may include one or more media servers, as required by the supported media formats.

A CDN server 102 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (again sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

Preferably, the CDN operates a DNS infrastructure to route client requests (i.e., request routing service) to a selected CDN server 102. In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN domain name service returns one or more IP addresses (via consultation with the mapmaker shown in FIG. 1). The requesting client application (e.g., a web browser) then makes a content request (e.g., via HTTP or HTTPS) to a CDN server 102 associated with the IP address. The request includes a host header that includes the original content provider domain or sub-domain. Upon receipt of the request with the host header, the CDN server 102 checks its configuration file to determine whether the content domain or sub-domain requested is actually being handled by the CDN. If so, the CDN server 102 applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server 102 should use when processing that request.

A CDN may have a variety of other features and adjunct components. For example the CDN may include a network storage subsystem (sometimes referred to as "NetStorage") which may be located in a network datacenter accessible to the CDN servers, such as described in U.S. Pat. No. 7,472, 178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. In a typical cache hierarchy, each client-facing server has a cache parent (or cache parent group), which may be statically or dynamically assigned. The child server goes to the cache parent to see if it has the object before going to the origin. If the parent does not have the object in cache either, then either the parent or the child server goes to origin. Some cache hierarchies have additional layers. For more information on cache hierarchies in CDNs, see U.S. Pat. No. 7,376,716 and see also Chankhunthod et al., "A Hierarchical Internet Object Cache", Proceedings of the USENIX 1996 Annual Technical Conference, San Diego, Calif. 1996, the disclosure of both of which is incorporated herein by reference for all purposes. For information on how cache parents can be dynamically chosen (and cache hierarchies formed based on network conditions and distances), see U.S. Pat. No. 7,274,658 the disclosure of which is incorporated by reference herein for all purposes.

Communications between CDN servers and/or across the overlay may be enhanced or improved using techniques such as described in U.S. Pat. Nos. 6,820,133, 7,274,658, 7,660, 296, the disclosures of which are incorporated herein by reference.

For live streaming delivery, the CDN may include a live delivery subsystem, such as described in U.S. Pat. No. 7,296,082, and U.S. Publication No. 2011/0173345, as well as a transcoding system as described in U.S. Pat. No. 9,432,704, the disclosures of which are incorporated herein by reference.

SUMMARY

This document describes systems, devices, and methods for testing the integration of a content provider's origin infrastructure with a content delivery network (CDN). In embodiments, the teachings hereof enable a content provider to rapidly and flexibly create test environments that route test traffic through the same CDN hardware and software that handle (or at least have the ability to handle) production traffic, but in isolation from that production traffic and from each other. Furthermore, in embodiments, the teachings hereof enable the content provider to specify an arbitrary test origin behind its corporate firewall with which the CDN should communicate, e.g., when it needs to issue a forward request to fetch content.

In a preferred embodiment, when CDN servers need to contact the content provider origin (e.g., a test origin site), they send their messages to a connector application run behind the firewall (e.g., on a developer's computer). The connector can be locally configured by the developer to route those message to a test origin of the developer's choosing. Put another way, the requests to a test origin are preferably sent to the developer's computer, which then determines the mapping of the host header(s) to the developer origin(s), so in effect the CDN only fetches content from the developer's computer.

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

BRIEF DESCRIPTION OF THE DRAWINGS

The invention will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

Basic familiarity with well-known web page, streaming, and networking technologies and terms, such as HTML, URL, XML, AJAX, CSS, HTTP versions 1.1 and 2, TCP/IP, and UDP, is assumed. The term "server" is used herein to refer to hardware (a computer configured as a server, also referred to as a "server machine") with server software running on such hardware (e.g., a web server). In addition, the term "origin" is used to refer to an origin server. Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

Introduction

Figure 2:
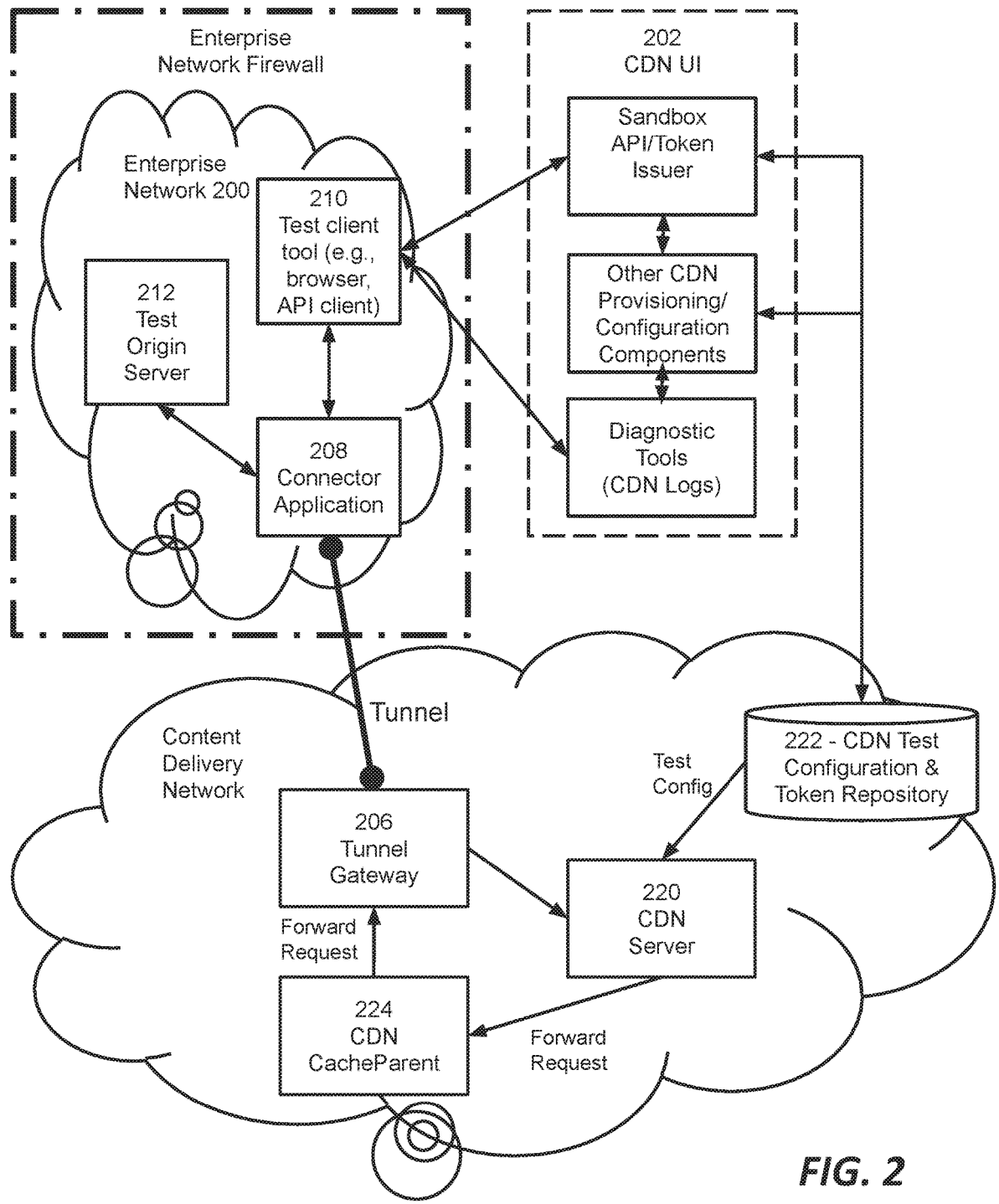
FIG. 2 is a schematic diagram generally illustrating a testing system, in one embodiment.

A general overview is now provided. FIG. 2 illustrates a system for testing integration between a CDN and a content provider origin infrastructure, in one embodiment. Network 200 represents the enterprise network of a content provider customer of the CDN. A user (e.g., a developer) within the enterprise network has a test origin server 212 and a CDN test configuration that he or she desires to test, e.g., because they are under development. The origin server 212 may be another computer in the enterprise network 200 running an origin server application, or an origin server application running on the user's own machine.

The user has access to a CDN user interface (UI) 202 from which the user (e.g., a developer working for the content provider) can download a connector application 208 for installation on their workstation or other computer of their choosing, and from which the user can provision the test environment. The user runs a client 210, which may be a browser or API client, or otherwise. Box 202 shows the CDN's provisioning components that are accessed via the UI 202. The UI may be a user interface running on machine hosted by the CDN, such as a website interface or a command line interface. These are sometimes referred to as a CDN portal. The UI 202 may be an API provided by the CDN that enables the user to programmatically communicate with the CDN configuration sub-systems that are highlighted in UI 202, e.g., through specified API calls issued to an API endpoint (which may be a URL). The term "UI" is used herein to refer broadly to any or all of the foregoing interfaces and further to include to any kind of portal or API or user to CDN interface, as well as the provisioning components accessed thereby in box 202. The UI 202 and the components in box 202 are preferably in communication with the metadata control 112 component illustrated and described in connection with FIG. 1; in this way, or as otherwise described herein, configurations ("metadata") created via the UI 202 can be distributed out to the CDN platform.

To set up a test environment, the user accesses the UI 202 to obtain a unique sandbox identifier, which is preferably encoded into a token (such as a JSON Web Token, or 'JWT Token'). Note that the UI 202 is typically hosted on a machine within the CDN, even though in FIG. 2 it is depicted outside the CDN for illustrative convenience. After obtaining the token, the user creates and associates a test configuration for the CDN (e.g., a file with metadata, as described earlier) with the sandbox identifier. Further, the sandbox identifier is installed in the connector application 208.

During a test, a client test tool, referred to as a test client 210 (e.g. a web browser) issues a request for content (e.g., an HTTP 'Get') to a test hostname. Preferably, the user modifies their computer's/etc/hosts file such that this test hostname points to the connector application 208. The connection application 208 labels the content request with the sandbox identifier that was installed therein, and contacts a tunnel gateway 206 in the CDN via a tunnel. The tunnel gateway 206 terminates that tunnel on the other side of the firewall. It locates a CDN server to handle the request, shown in FIG. 2 as CDN server 220, and it forwards the request to the CDN server 220. The CDN server may be a server in a production network in the CDN that is handling actual live production traffic. Alternatively, it may be a server in staging network (see, e.g., U.S. Pat. Nos. 6,981,180 and 7,111,057 the teachings of both of which are hereby incorporated by reference; see also FIG. 1 herein, staging 121). A staging network is a subset of the overall production network designed for incremental rollout of new configurations.

The "tunnel" referred to above is preferably a persistent TCP connection secured by TLS. The secure connection carries (as payload) IP packets addressed sent from the test client 210 which will be routed to the CDN Server 220. In some embodiments, the tunnel may be designed to utilize generic routing encapsulation (GRE) with IPSec, but this is not required. Any kind of network tunnel can be used, but the term tunnel is used herein to indicate the transmission of the test client 210 to CDN server 220 packets as payload inside the connector application 208 to tunnel gateway 206 packets in the tunnel.

Generalizing, the "tunnel" can be implemented with simply a secure connection carrying the 'test client 210 to CDN server 220' packets as payload, and/or data sufficient to reconstruct such packets after an encoding/decoding process. The secure connection can operate at the application layer of the network stack, secured by TLS, and allowing for communication with multiplexed messaging in both directions. The secure connection carries representations of HTTP requests so these HTTP requests can be reconstructed at the other end of the tunnel so that they can be parsed and executed on either side. More detail on potential implementation approaches for the tunnel will be described later in connection with FIGS. 7A and 7B.

The CDN server 220 receives the content request and recognizes the presence of the sandbox identifier. In response to the presence of the token and/or other factors (described in more detail below) it obtains and applies a test configuration from repository 222, using the sandbox identifier as a key. It obtains and applies the test configuration rather than matching on the hostname in the HTTP 'Get' request and applying a production configuration, which would otherwise occur.

Assume the CDN server 220 applies the test configuration and determines it does not have the content. It can go forward to cache parent 224, which then goes forward to the connector application 208 via the tunnel gateway 206 to get the content (assuming the parent 224 does not have the content cached either). The connector application 208 then routes the forward request to the test origin server 212, based on its local configuration, which was set up by the user. In an important variant of the foregoing, the CDN server 220 can simply send the forward request directly back to the connector application 208 via the tunnel gateway 206, i.e., without going to the CDN cache parent 224.

In either case, the user's computer (and specifically the connector application 208 running on the user's computer) is responsible for locating and contacting the test origin 212 within the enterprise network. The test origin 212 sends the content identified in the forward request back to the CDN server 220 (and/or the cache parent 224), and then the CDN server 220 can cache the content and respond to the test client 210. Note that if the cache parent 224 was involved in the forward request chain, then the cache parent can receive the content back from the test origin, cache it, and then send to the CDN server 220, as those skilled in the art will understand.

The CDN server 220 and/or cache parent 224 preferably caches any responsive content from the test origin 212 using not only the URL of the item but also the sandbox identifier (e.g., incorporating both into a hash). This ensures isolation between test objects and production objects cached in the CDN.

With the foregoing by way of overview, embodiments of the invention are now described in more detail.

Figure 3:
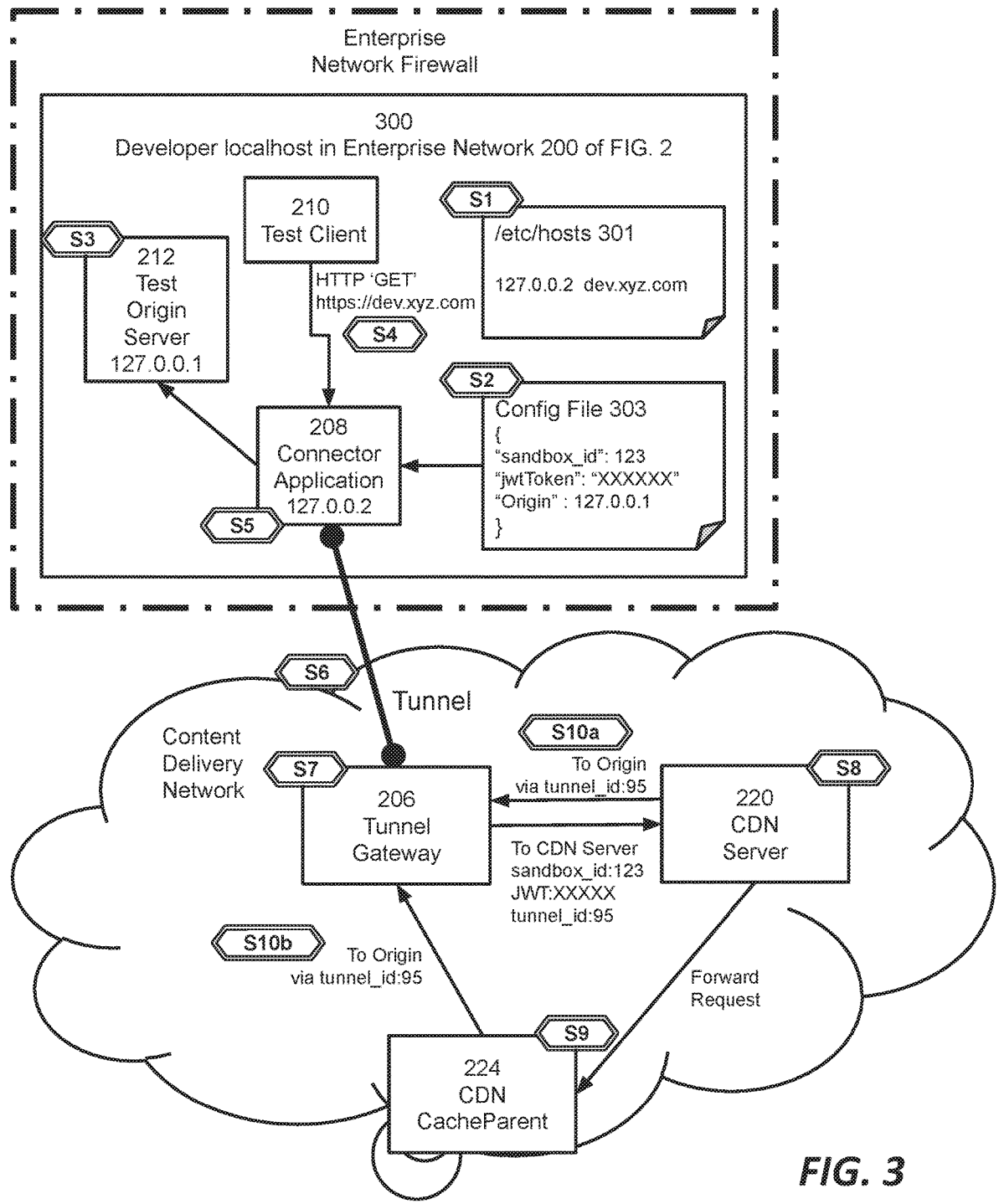
FIG. 3 is a schematic diagram generally illustrating a testing system, in one embodiment.

FIG. 3 provides more detail on certain aspects of the system shown in FIG. 2. FIG. 3 also includes labels S1 to S10*b*, which correspond to particular operations or aspects of the system that are discussed below.

At S1, the user (e.g., the developer) configures his or her local computer to route traffic to the connector application 208. This can be done by adding an entry to the computer's /etc/hosts file 301. In FIG. 3, the file 301 specifies that requests directed to the hostname dev.xyz.com should be resolved to IP address 127.0.0.2, which corresponds to the connector application 208. In other embodiments—and where practical—the user could configure the enterprise network local DNS to make an analogous change.

The general teachings hereof and foregoing approach in particular enables the user to test with a hostname of their choosing. Many websites, particularly heavily javascript-based sites can be sensitive to the hostname in the browser bar. It gives the user the flexibility of using whichever hostname works with their pre-production site.

The connector application 208 is preferably configured via a configuration file 303. At S2, the user configures the connector application 208 by adding information to the configuration file 303. The information includes the sandbox identifier, and a token, preferably a JSON Web Token (JWT), that encodes the sandbox identifier. Both are obtained from the UI 202 as shown in FIG. 2. The information also includes the hostname or IP address of the test origin 212 of the user's choosing.

At S3, the user sets up their test origin 212. A pre-production developer origin could be running anywhere including behind the firewall or even on the user's local machine. In FIG. 3, the origin server application 212 is illustrated as running on the local machine 300, but this is only by way of example.

Now the user begins a test. At S4, the test client 210 makes a web request to the website, which they have mapped to the locally running connector application 208. They can use the client tool of their choice (curl, web browser, etc.).

At S5, the request is mapped to the connector application 208, based on the /etc/hosts file 301. Note that the connector application 208 could be running elsewhere in the enterprise network; in FIG. 3 it is illustrated as being on the user's local machine.

The connector application 208 opens a secure transport layer security (TLS) tunnel through the corporate firewall to the CDN's tunnel gateway 206. This is labeled S6 in FIG. 3. There occurs asymmetric mutual authentication between the connector application 208 and the tunnel gateway 206 (e.g., from connector application 208 to the tunnel gateway 206 using the JWT, and from Gateway 206 to the connector application 208 using a server certificate, e.g., signed X.509 certificate). The user's pre-production web requests to the origin are routed through this tunnel to the CDN platform. As will be seen, requests made by the CDN to the test origin server 212 (e.g., forward requests) are also sent back through this tunnel.

The connector application 208 will terminate HTTPS connections on the enterprise side (e.g., connections from the test client 210 and the test origin 212. It will modify outbound messages by injecting relevant headers from the configuration file 303 (e.g. sandbox identifier. JWT), and send those requests through the tunnel to the tunnel gateway 206. The connector application 208 preferably is listening on an alternate loopback address (e.g., 127.0.0.2 in FIG. 3). The TLS tunnel is opened on demand and closed after a period of inactivity.

The CDN preferably deploys a plurality of tunnel gateways 206 throughout its platform. The connector application 208 preferably locates a suitable tunnel gateway 206 by making a request to a predetermined hostname to a DNS system configured and managed by the CDN for that purpose.

Turning to label S7, the tunnel gateway 206 terminates the tunnel on the public Internet side of the firewall. The tunnel gateway 206 presents a server certificate proving that this is a valid CDN machine acting as a tunnel gateway 206. The tunnel gateway 206 is responsible for maintaining the tunnel connection and routing traffic to nearby CDN servers, such as CDN server 220. Upon receipt of an incoming 'Get' request, the tunnel gateway 206 preferably injects two headers: the tunnel_id, which is the identifier of the tunnel on that tunnel gateway 206 instance, as well as the tunnel_location, which is the IP address of the tunnel gateway 206 itself. This information will travel with the content request while it is within the CDN platform.

The tunnel gateway 206 forwards the request to a CDN server 220. JWT validation can occur at the tunnel gateway 206 for greater protection, or it can wait until the CDN Server 220 is reached. Note that in some embodiments, the tunnel gateway 206 and the CDN server 220 could be implemented as two programs running on the same machine.

Processing at the CDN server 220 is now described, with respect to label S8. As shown in FIG. 3, the 'Get' request originated by the test client 210 arrives at the CDN server 220 with a sandbox identifier (sandbox_id), tunnel identifier (tunnel_id), and a token in the form of a JWT, as well as tunnel_location data.

Figure 1:
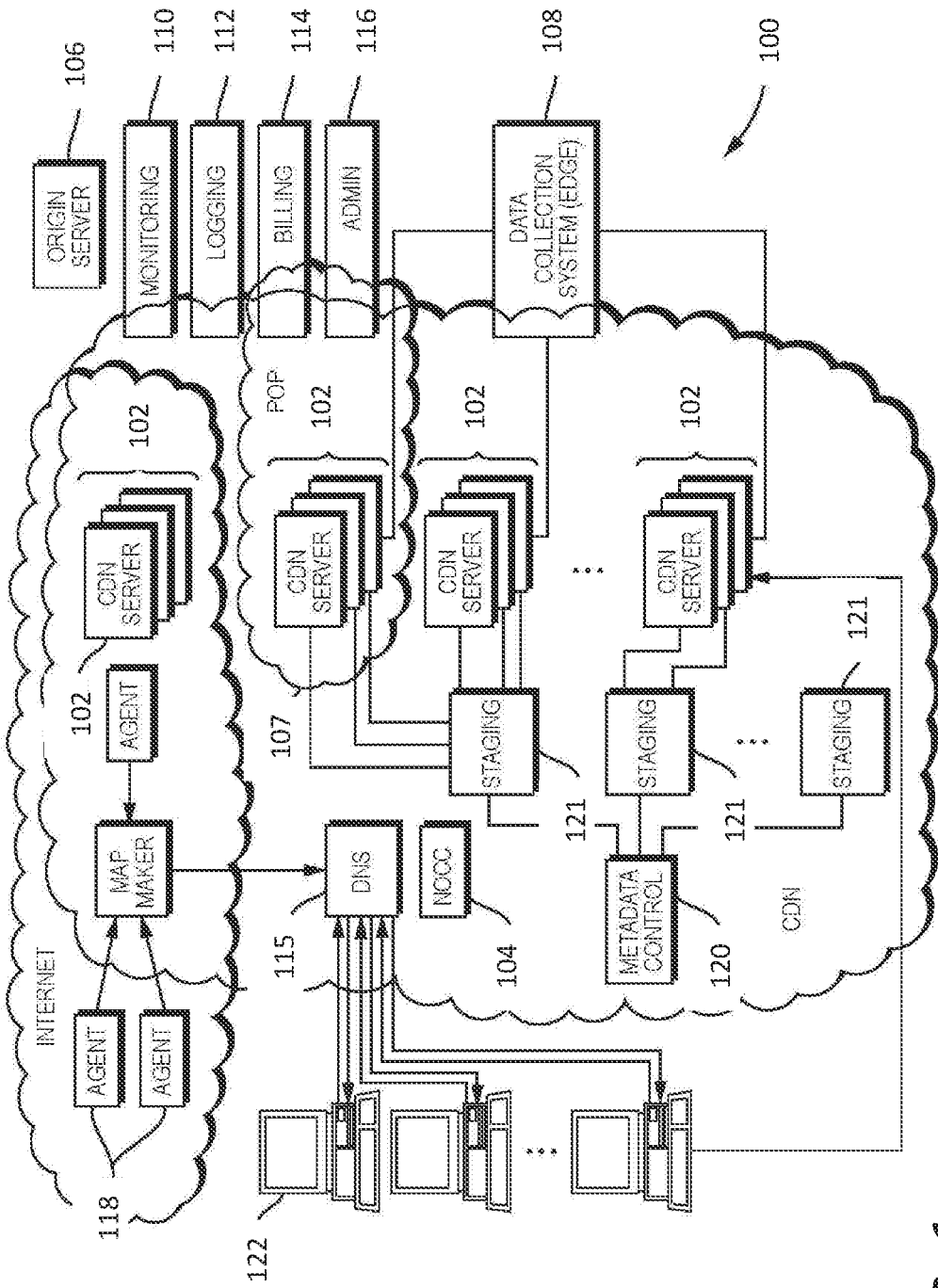
FIG. 1 is a schematic diagram illustrating one embodiment of a distributed computer system configured as a CDN.

The CDN server 220 may be a production machine, i.e., handling actual content provider traffic from actual end-users of the content provider's live website, which correspond to CDN Servers 102 in connection with FIG. 1. Preferably, the CDN server 220 is part of a staging network that represents a subset of the machines in the CDN 220. The use of a staging network to gradually roll out and to test changes to CDN configurations is described in U.S. Pat. Nos. 6,981,180 and 7,111,057, and the teachings thereof are hereby incorporated by reference for all purposes.

Conventionally, the CDN server 220 would examine the hostname in the test client's HTTP Get request (i.e., dev.xyz.com) and look up this hostname in an index to find a matching configuration file to apply. However, in this situation, the hostname is a test hostname and it is desirable to apply the test configuration that the user desires as well as to send the traffic back through the tunnel, which is not conventional operation. Hence, in this system, the hostname is not used to locate the configuration rather, the presence of a valid JWT and the sandbox_id, causes the CDN server 220 to determine to request the test configuration from the repository 222 (FIG. 2). The sandbox_id is used as the basis for a key to look up the proper test configuration in the repository 222. Using this information, the CDN server 220 retrieves and caches the test configuration.

The CDN server 220 applies the directives in the configuration file, be they settings or rules, to determine how to process the request, what features to invoke, and the like. This process is known in the art and the teachings hereof are agnostic to the particular settings and rules that a configuration may provide. As mentioned earlier, the use of a configuration file containing metadata is described for example in U.S. Pat. No. 7,240,100 and U.S. Patent Publication No. 2007/0156845, the teachings of both of which are hereby incorporated by reference.

There are many possible actions that could be taken by the CDN server 220 as a result of processing and applying the configuration file settings. One typical action is a proxy operation. The CDN server 220 attempts to locate the requested object in a local cache. If the cache does not contain a valid copy of the object (e.g., because it is not present or because it is present, but stale), then the CDN server 220 may generate a forward request. A forward request is a known kind of request in which the proxy server generates an HTTP request for the content and sends it to the content provider's origin server to obtain a fresh copy of it. In some cases, the CDN server 220 may include custom headers, authentication secrets, or other information in this forward request to the content provider's origin. Typically, the configuration file includes the hostname or IP address of the origin server that the CDN server 220 should use.

According to the teachings hereof, however, the CDN server 220 sends the forward request back to the originating tunnel gateway 206, which will send it to the connector application 208. This is indicated by S10*a*. Preferably, the forward request is wrapped in a packet that is addressed to the IP address to the computer running the connector application 208. That packet is encapsulated in a packet addressed to the tunnel gateway 206. The tunnel_id is included with the forward request. Upon receipt of this forward request, the CDN server 220 consults the tunnel_location information to locate the correct tunnel gateway 206; the tunnel gateway 206 consults the tunnel_id information to identify the correct tunnel (see request flow diagram in FIG. 3, showing tunnel id of 95).

There are some scenarios in which CDN servers may contact the origin server indirectly. This means that the CDN server's 220 forward request may be sent to other elements in the CDN before reaching the tunnel gateway 206. For example, in many cases, a CDN implements a cache hierarchy in order to reduce the need to contact the origin. If so, the CDN server 220 will have assigned or be able to locate a cache parent. The cache parent is designated in FIGS. 2/3 as cache parent 224. Upon experiencing a cache miss, the CDN server 220 contacts the cache parent 224 to obtain the requested object (preferably including the tunnel information), as shown by labels S9 and S10*b*. If there is a cache miss at the cache parent 224, then the cache parent 224 can send the forward request to the connector application 208 (via the tunnel gateway 206). Alternatively, of course, the cache parent 224 could notify the CDN server 220 of the cache miss, and the CDN server 220 itself could send the forward request directly to the connector application 208, via the tunnel gateway 206, as already described.) Cache hierarchies are known in the art and more information about them can be found in U.S. Pat. No. 7,376,716, the teachings of which are hereby incorporated by reference.

Another example of an "indirect" forward request might occur when the CDN has provided infrastructure to act as security layer fronting the origin. The infrastructure is typically in the form of a machine (or set of machines) that are uniquely authorized to contact the origin. This configuration enables a content provider to reject any traffic not from the CDN; indeed the content provider may not even advertise or have publicly routable IP addresses for their origin. More detail about this approach, sometimes referred to as Site Shield, can be found in U.S. Pat. No. 7,260,639, the teachings of which are hereby incorporated by reference.

Turning back to FIG. 3, back at S5, the connector application 208 receives the forward request and looks at the local configuration set up by the user in the Config File 303 (e.g., by specifying a hostname or IP address for the origin, in FIG. 3, the example is "Origin": 127.0.0.1). Based on this local configuration, the connector application 208 routes the forward request to the specified test origin 212 (label S3) at the specified IP address, and the test origin 212 can then respond with the requested content back through the tunnel to the CDN server 220. The CDN server 220 preferably caches the object and then responds to the test client 210 by sending an HTTP response message addressed to the computer that hosts connector application 208.

Figure 4A:
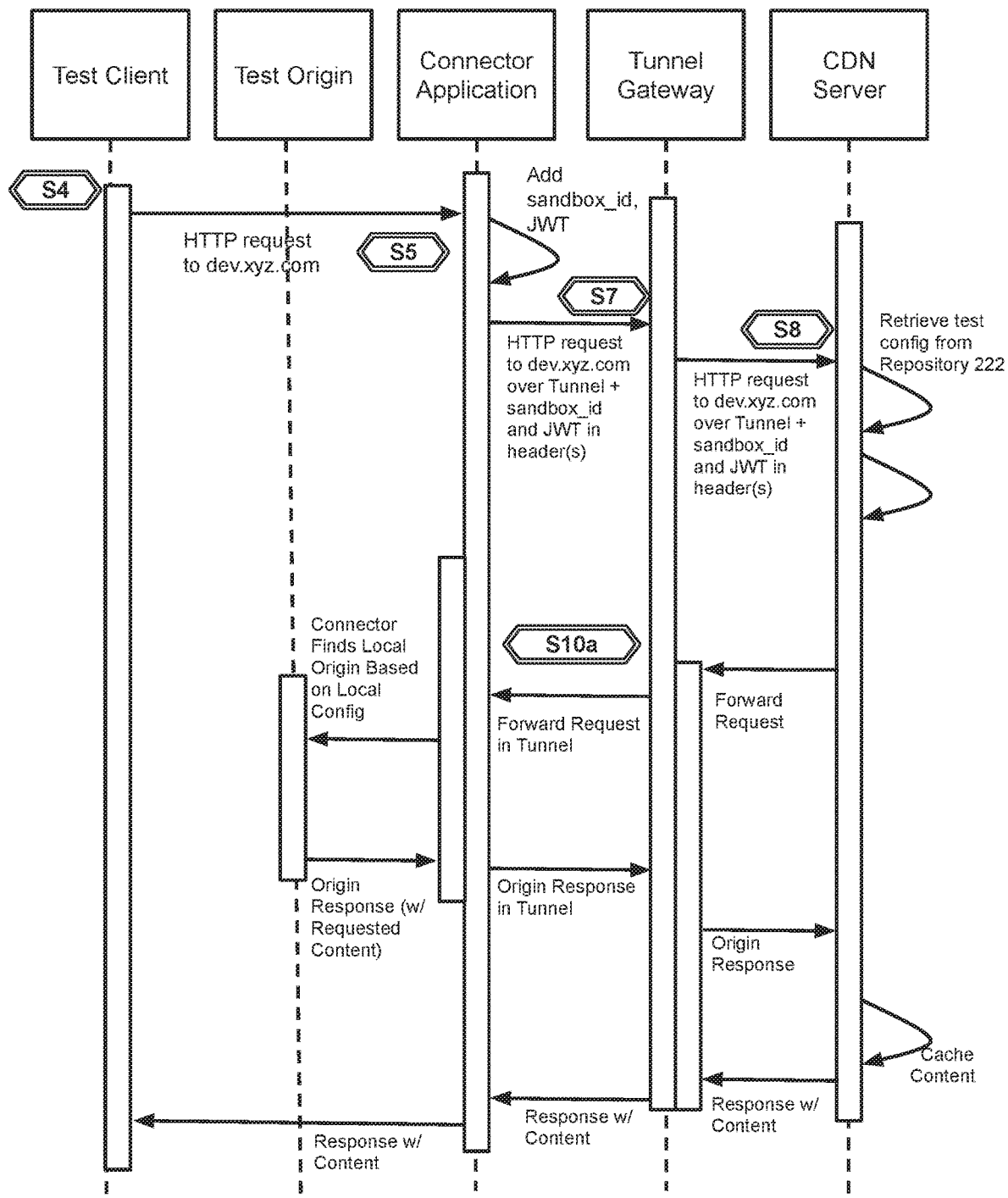
FIG. 4A is a sequence diagram illustrating message flow in the system shown in FIG. 3, in an embodiment.
Figure 4B:
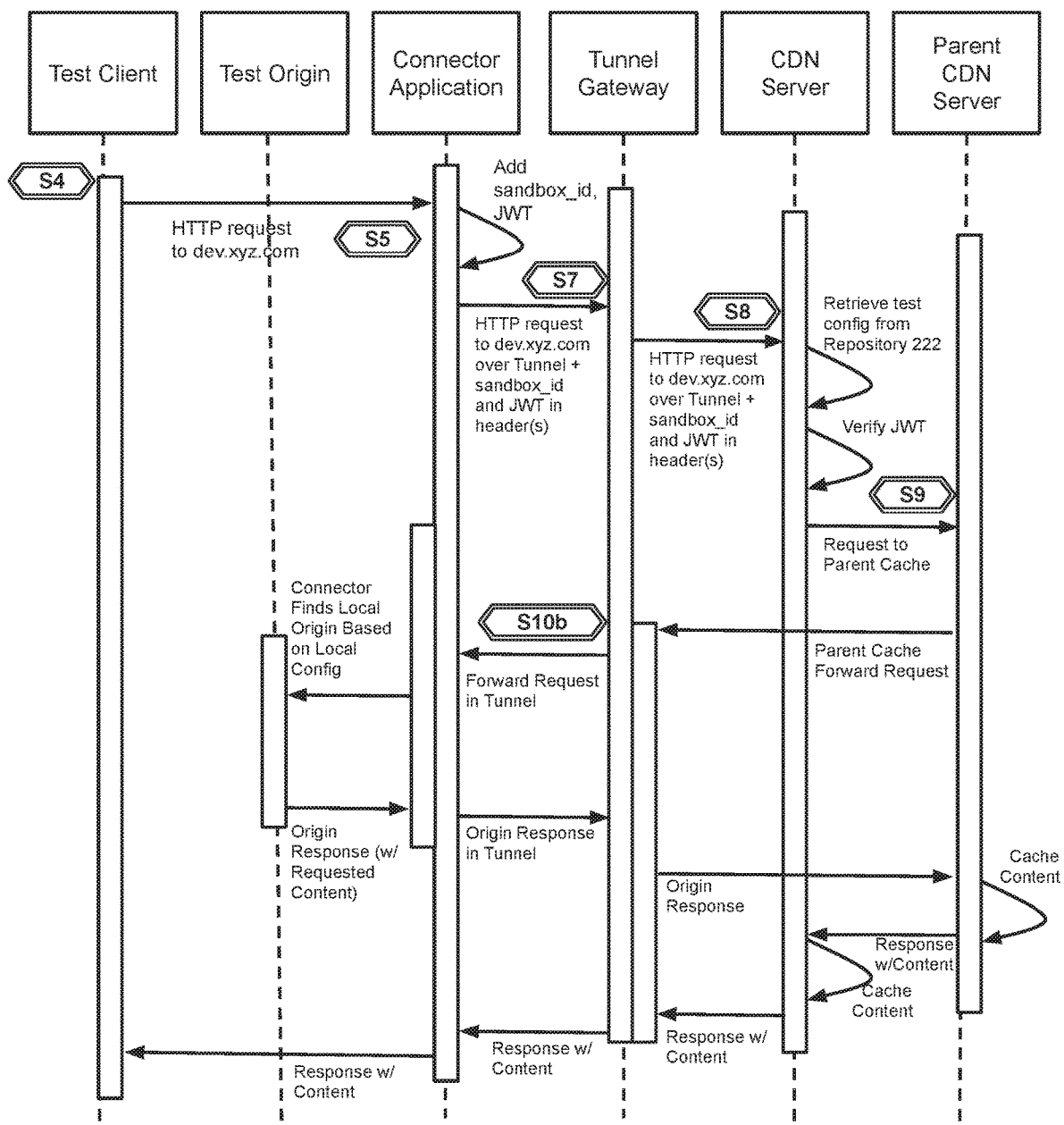
FIG. 4B is a sequence diagram illustrating message flow in the system shown in FIG. 3, in another embodiment.

FIG. 4A is a sequence diagram showing the message flow in the system, as just described above, but for the case where path S10a is used (i.e., the CDN Server 220 does not use the parent cache 224). FIG. 4B is a sequence diagram showing the message flow in the system, as just described above, in the case where path S10b is used i.e., the CDN server 220 issues a request to the parent cache 224. which then goes forward to get the content. Note that FIG. 4B shows the parent cache 224 responding to the CDN server 220 after it obtains the requested content from origin; the CDN server 220 then responds to the test client 210. However, m other embodiments, the parent cache 224 can respond directly to the test client after it obtains the requested content.

Implementation of Tunnel Gateways and CDN Servers

Machines in the CDN that were originally described in the Background section (e.g., CDN servers 102) may be re-purposed to function as tunnel gateways 206 and/or CDN Servers 220. This means that the software on CDN servers 102 may be modified or augmented to process test traffic as described herein. Alternatively, the tunnel gateway 206 may be implemented on a distinct subset of CDN servers 102 that is designed for rapid access and updating/prototyping by CDN and content provider developers.

As noted earlier, CDN Servers 220 may be production machines and/or part of a staging network in the CDN. The tunnel gateways 206 may be part of this same staging network.

Preferably, tunnel gateways 206 are spread throughout the staging network. A given connector application 208 locates a suitable, nearby tunnel gateway 206 by making a DNS request to a predefined hostname managed by the CDN, e.g., tunnel-gateway.test-cdn.net, which the DNS service will resolve to a nearby tunnel gateway.

Likewise, the tunnel gateway 206 can locate a suitable, nearby CDN server 220 by using a DNS mapping system. For example, the tunnel gateway 206 can query a known hostname (e.g., sandbox-network.test-cdn.net) managed by the CDN, which the DNS service will resolve to a nearby CDN server 220. In some implementations, the hostname can be constructed by the Tunnel Gateway to be specific to the sandbox identifier, e.g., {sandbox_id}.test-cdn-net.

More Detail on Configuration Loading at CDN Server 220.

Upon receipt of a content request, the CDN Server 220 must determine whether that request is a sandbox request or a production request. If the request is a sandbox request, the CDN Server 220 obtains and loads the test configuration; if the request is a production request, the CDN server 220 obtains and loads the production configuration. In general, the CDN server 220 examines information in the content request, and based thereon, determines to obtain and apply the test configuration.

More specifically, in one embodiment, upon receipt of a request, the CDN server 220 goes through a series of checks to make the determination of whether to apply the test configuration or production configuration. First, the CDN server 220 determines whether the request is a sandbox request based on the presence of the special JWT in a header of the request message That token preferably embeds information such as the sandbox identifier. Second, the CDN server 220 determines whether it is capable of serving a sandbox request, e.g., is it in the staging network and capable of serving staging traffic (i.e. rather than in the production network). This can be determined by consultation to a local setting and/or a determination that the request arrived on a particular IP address (e.g. virtual IP address) reserved for and corresponding to staging network machines. This means that the CDN server 220 would examine the destination IP in the packet. Third, the CDN server 220 verifies that the JWT is valid for the given sandbox. More details on JWT structure and tokenization are provided below. If these checks are passed then the CDN server 220 retrieves the sandbox identifier from the JWT and uses that identifier to load the corresponding test configuration.

Of course, while the above is a preferred embodiment, a subset of the above checks can be used in alternative embodiments.

JSON Web Tokens

JWTs and associated signature and algorithmic techniques are known in the art and are standardized at least in RFC 7515, RFC 7518, RFC 7519, RFC 7520. Preferably, a JSON Web Signature (JWS) message or JSON Web Encryption (JWE) message is used to encode the JWT. For example, a JWS is a JSON object made up of three parts: a JSON Object Signing and Encryption Header (JOSE), a JWS Payload, and a JWS signature. The header indicates the type of object in the payload (such as a a JWT) and the algorithm used to calculate the signature (such as a HMAC and SHA-256).

The JWT itself is a string representing a set of claims as a JSON object. In the use case envisioned by this document, the claims can include statements about the sandbox, namely a sandbox identifier, as well as other information.

The reader is referred to the foregoing RFCs for more information.

Below is an example of a JWT for use in the teachings hereof. The JOSE header specifies the algorithm used for signing, which could be any algorithm specified in sections 3.1 or 4.1 of RFC 7518, including keys and key management algorithms based on RSA, HMAC/SHA, AES, or Elliptic Curve Diffie Hellman techniques. In the example below the algorithm is specified as RSAES-PKCS1-v1_5. The payload section represents the JWT claims set, in this case, there is one claim providing a sandbox identifier of 1234.

Token Structure.

```
// header section
{
    "alg": "RSA1_S",
    "typ": "JWT"
}
// payload section
{
    SandboxId: 1234
}
// signature section
XXXXXXXXXXXXXXX // signature is function of header, payload, and private key
// above 3 sections are joined together like this:
base64encode(header).base64encode(payload).signature
```

JWT Authentication

In a preferred embodiment, the JWT authentication works as follows:

1. As part of provisioning in the UI 202, the CDN generates a MT and returns that to the user. The JWT embeds the sandbox id.
2. The UI 202 generates a key pair (e.g., RSA key pair, or otherwise) on the fly using standard libraries. The private key gill he used to sign the JWT. The public half will be used to validate the JWT.
3. The public half of the key will stored by the CDN.
4. The private half of the key will be disposed of by the CDN The JWT signed with the private key is retained.
5. The user will enter the JWT they receive into the connector application 208 configuration file 303.
6. The connector application 208 will inject the JWT as a header on requests headed to tunnel gateway 206.
7. The CDN Server 220 will validate the JWT using the public key.

CDN Server Validation of JWT

To be able to validate a JWT a given CDN server 220 must have the public key for the sandbox with which the JWT is associated. One way to do this is for the UI 202 or associated components to create a mapping of sandbox identifier to public key ("public key record"), which the CDN server 220 can retrieve on-demand. Hence, to process a JWT, a CDN server 220 would load the public key record, validate the JWT, and then load the test configuration identified by the sandbox identifier in the JWT. Local caching of the public key record and/or test configuration can be utilized.

Overhead Relating to TLS Tunnels

Preferably, TLS connections serving as the TLS tunnels are long-lived. The tunnel gateway 206 can employ a variety of strategies to prune active tunnels. For example, the tunnel gateway 206 could terminate tunnels that are inactive for a particular time period. The tunnel gateway 206 could prune tunnels if the number of tunnels exceeds a threshold, regardless of activity. TLS session resumption can also be employed, per RFC 5077.

The same optimizations can be applied to TLS connections between tunnel gateways 206 and CDN server 220.

Provisioning Workflow

Provisioning involves creating a sandbox for a given test origin 212. This involves two steps: creating the sandbox and distributing the sandbox's test configuration file to the CDN server 220. Preferably, this is performed using a single API endpoint. The user will register two inputs, their test origin and desired test configuration, and receives in response a unique sandbox (with sandbox identifier) they can test with, and an access token (e.g., the JWT). Each account will be provisioned a specific code that should be used in reporting traffic sent to the sandbox in logs produced by the CDN Server 220. This will be used when reporting data/billing and also for purging content from cache in the CDN Server 220.

Figure 5:
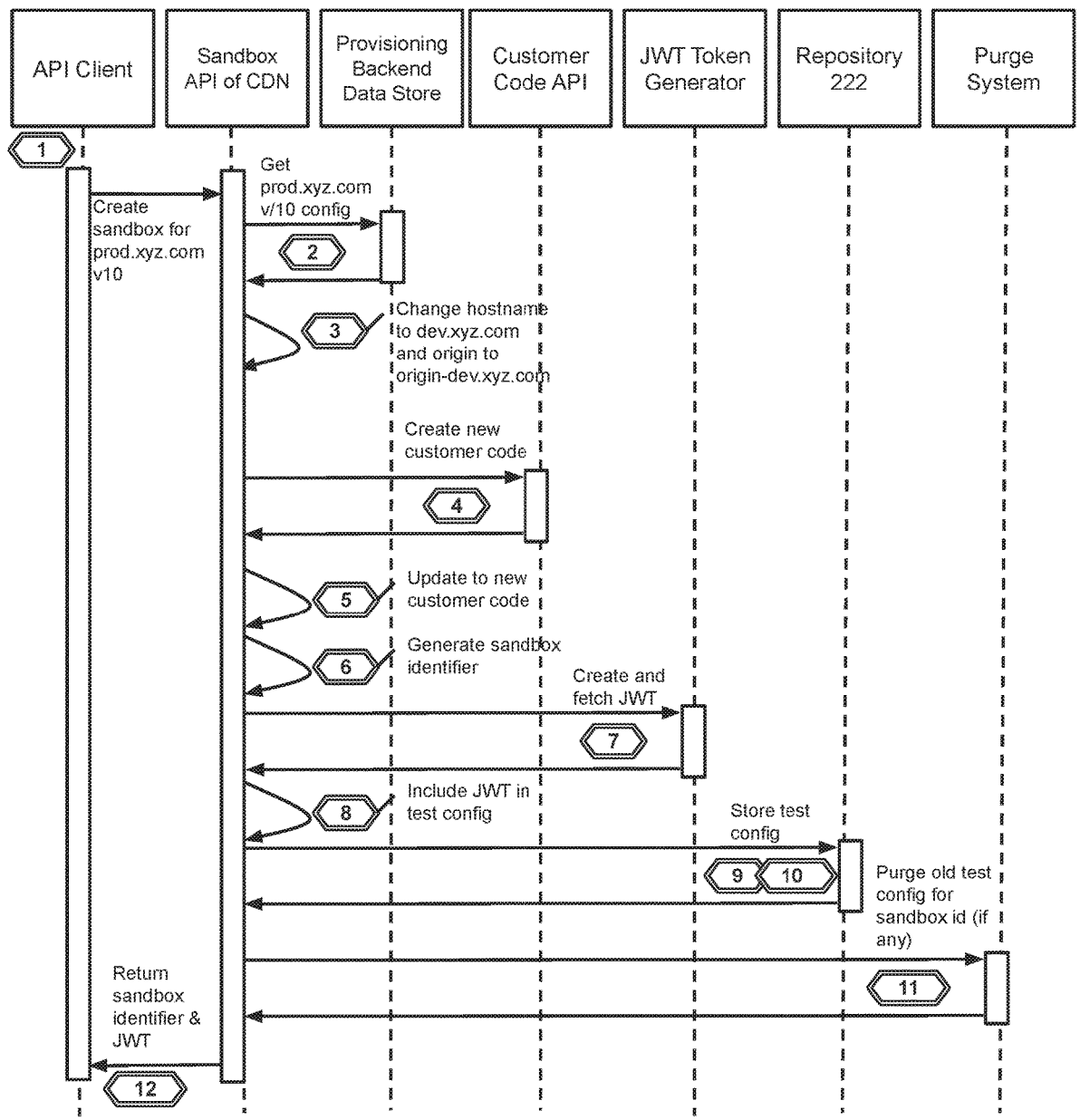
FIG. 5 is a sequence diagram illustrating messages in a provisioning workflow for the testing system.

FIG. 5 is a diagram showing a preferred embodiment of the provisioning workflow. The steps performed by the CDN are described below:

1. User employs the UI 202 to call sandbox API. The sandbox API is a kind of provisioning API, and may be part of the general provisioning API provided by the CDN for all/other provisioning. The user provides input, including information about what test configuration to push, hostname to test and development origin server.
2. Provisioning API retrieves the configuration from a data store. A current production configuration can be cloned to create a test configuration.
3. Replace the specified hostname and origin server with new values.
4. Call Customer Code Management API to provision new customer code or obtain the customer code of the user.
5. Replace the code in test configuration with the above code.
6. Generate a sandbox identifier, which is a unique identifier within the test environment. This is what defines the uniqueness of a sandbox and keeps multiple sandboxes isolated.
7. Provision JSON Web Token (JWT).
8. Associate JWT public key to the test configuration, later to be used by CDN Server 220 for authenticating requests.
9. Push the test configuration to the repository 222 (which is acting as source for the test configuration files). Before the files get pushed, preferably the test configurations are deployed to a live check server for network safety. The configurations that pass live check server will be pushed to the repository 222. Preferably the live server check includes a syntax and safety check. However, because a live server check may take some time, in some implementations, the configurations are pushed to the repository 222 and the live check is performed asynchronously. Should the live check fail, the system can remove the configuration and terminate any sandboxes using it.
10. Store the test configuration in the repository 222 and update a mapping of sandbox identifier to test configuration filename in a data structure. This data structure can also contain the mapping of sandbox identifier to a public key record (i.e., the "public key record" that was described earlier with respect to JWT validation). The data structure can then be distributed (in whole or in part) to CDN Servers 220.
11. Issue a purge by URL to purge the cached test configuration on CDN Servers 220. The systems described in U.S. Pat. No. 7,111,057 and/or U.S. Pat. No. 9,648,125 can be used for this purpose, in one embodiment.
12. Return to the user the sandbox identifier and JWT, to be passed as headers when testing in that sandbox.

Figure 6:
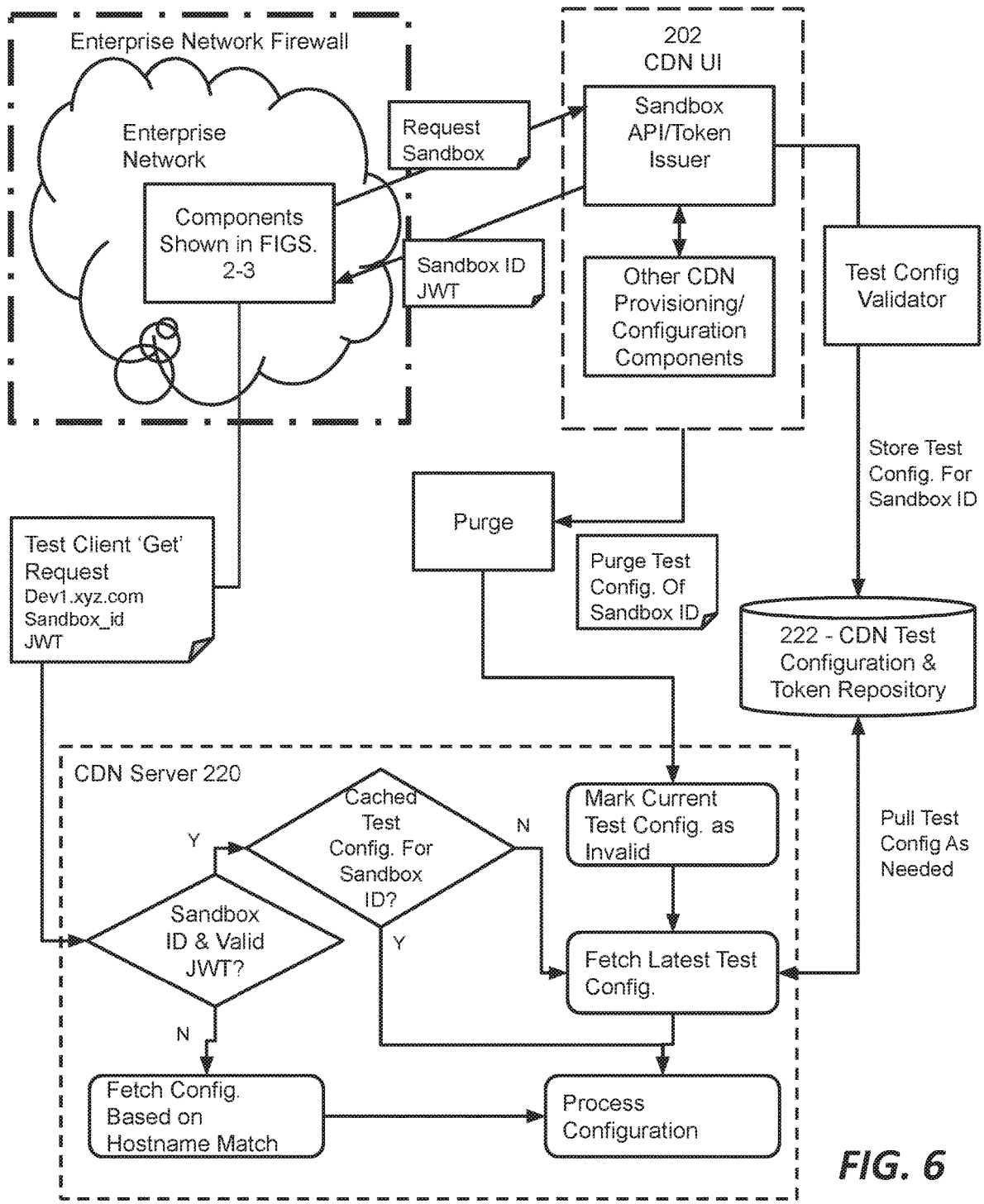
FIG. 6 is a schematic diagram illustrating, in one embodiment, the distribution of test configurations to CDN servers shown in FIGS. 2-3.

FIG. 6 is a schematic diagram illustrating the provisioning process in a block diagram/workflow format, along with the process for how the CDN Server 220 can obtain the test configuration upon receiving a test client request.

Once the test configuration is defined and stored in the CDN's repository 222, they must be deployed to CDN servers. Test configurations can be deployed to the CDN Servers 220 using any technique described in U.S. Pat. Nos. 7,240,100, 9,736,271, 9,667,747, 9,654,579, and 9,509,804, the teachings of all of which are hereby incorporated by reference. Techniques described in those patents include both push-based and pull-based approaches.

FIG. 6 illustrates the distribution of test configurations to CDN servers 220 using a pull-based approach. In this model, a CDN Server 220 relies on the sandbox identifier in the header to derive the corresponding test configuration filename. It then pulls the test configuration file from the repository 222, caches it locally for some time period (e.g., based on TTL). The CDN Server 220 can purge this file and fetch a new one when the cached copy expires, or when a new configuration is pushed to the repository 222 (which causes a purge of existing test configurations, per step 11 above).

More specifically, the first time that a CDN Server 220 sees a client content request associated with a particular test configuration, the CDN server 220 will check its cache of test configurations, and find that the test configuration is marked invalid. Hence, the CDN Server 220 will issue a request with an if-modified-since (IMS) request to the repository 222 for the test configuration file. Because the new test configuration has been modified, the repository 222 will send the new version of the test configuration. The CDN Server 220 will load this new test configuration in memory and apply it to the pending client request. The new test configuration will be cached locally (and preferably in a cache hierarchy parent 224) for future requests. As noted before, the cache key preferably is based on (at least in part, such as HMAC{concatenate(URL, sandbox ID)} the sandbox identifier. This is done to ensure isolation between sandbox content and production content, as well as between the content of different sandboxes.

More detail about potential implementations of the tunnel are now described.

Figure 7A:
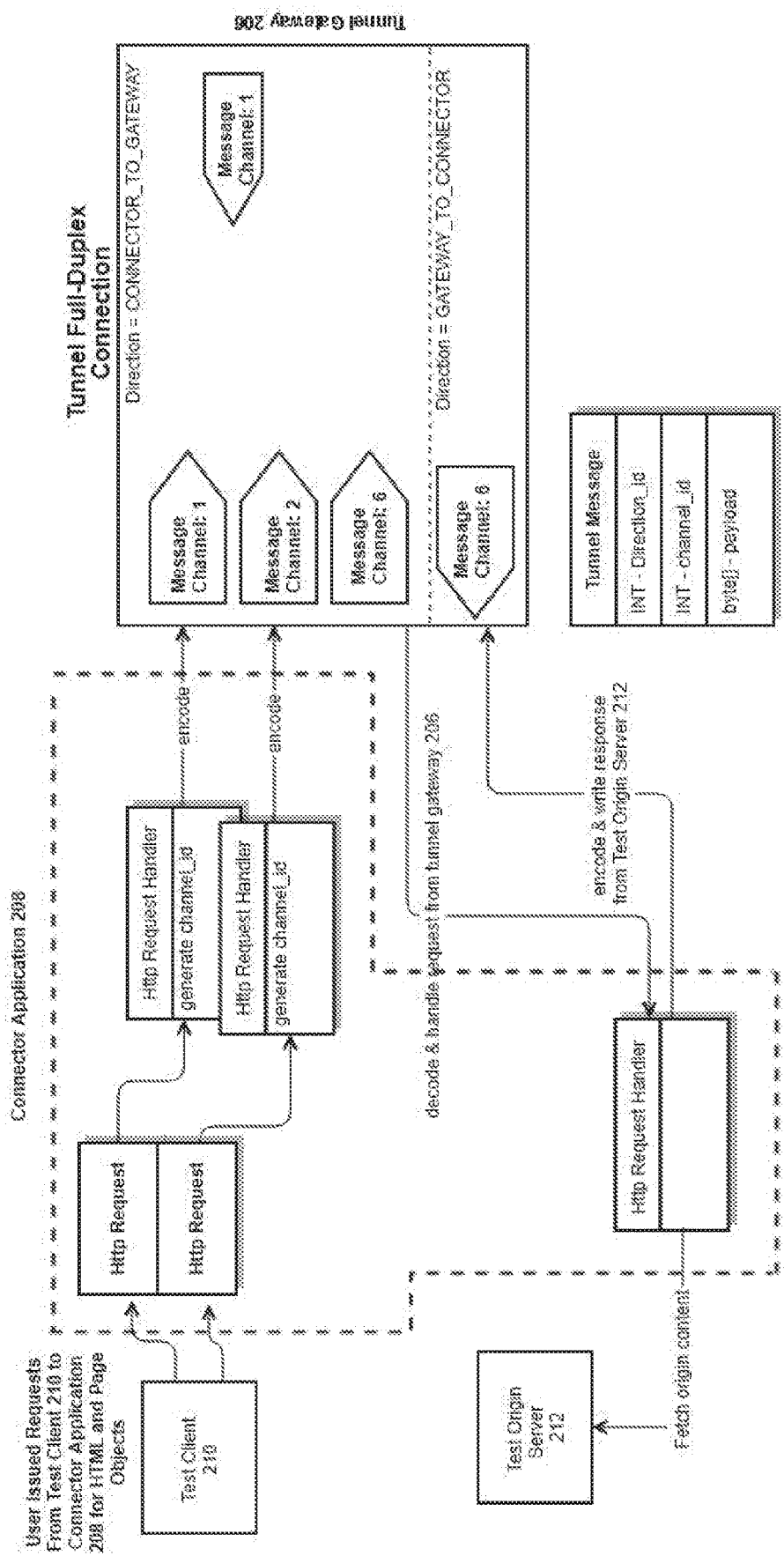
FIGS. 7A-7B are schematic diagrams illustrating the message flow in the tunnel shown in FIG. 1, in different embodiments.

FIG. 7A depicts an embodiment of the flow of messages and the tunnel between the connector application 208 and a tunnel gateway 206. A test client 210 (e.g., a browser) generates HTTP requests for content, which are directed to the connector application 208, designated by the dashed lines. Typically, browsers open multiple connections in parallel to download the HTML for a web page, as well as object embedded on the page, e.g., images, scripts, etc. A typical number is six connections to a domain name. The fact that multiple connections may be opened is illustrated in FIG. 7A by the multiple HTTP requests coming from the test client 210. In this implementation, the tunnel is a full duplex tunnel, enabled by a custom application layer protocol on top of a TLS-secured transport layer connection between the connector application 208 and tunnel gateway 206. The parallel HTTP requests are funneled through the single tunnel. The custom application layer uses a labeling mechanism shown in the box "Tunnel Message". A message in the tunnel has a label indicating which direction it is going, a channel identifier, and payload. The direction means either connector application 208 to tunnel gateway 206, or vice versa. The channel identifier is a unique identifier in the context of the tunnel that enables each connection (each carrying its own HTTP message exchange for a web object) to be uniquely identified. Hence, for example an HTTP request and response for the HTML of a web page can be distinguished from the HTTP request and response for the CSS of the page, or for an image file referenced in the HTML, and so on. The payload is the actual (encapsulated) HTTP request message generated by the test client 210, or the HTTP response generated by the test origin 212.

As those skilled in the art will understand, the tunnel implementation shown in FIG. 7A thus provides a persistent duplex communication connection that multiplexes messages from connector application 208 to tunnel gateway 206. The connector application 208 encodes the tunnel message labels and takes care of demultiplexing HTTP messages associated with the various channels to the appropriate socket at the test client 210. The tunnel gateway 206 routes upstream messages (with the content requests from the client) from the connector application 208 to the CDN Server 220 that the tunnel gateway 206 selected, injecting the IP address of the tunnel gateway 206 (tunnel_location data) and a tunnel identifier into the messages before doing so. The CDN server 220 routes those requests to the origin by sending them back to the tunnel gateway 206 based on the IP address of the tunnel gateway 206. The tunnel gateway 206 then places the requests to the origin into the tunnel to the connector application 208, based on the tunnel identifier.

Figure 7B:
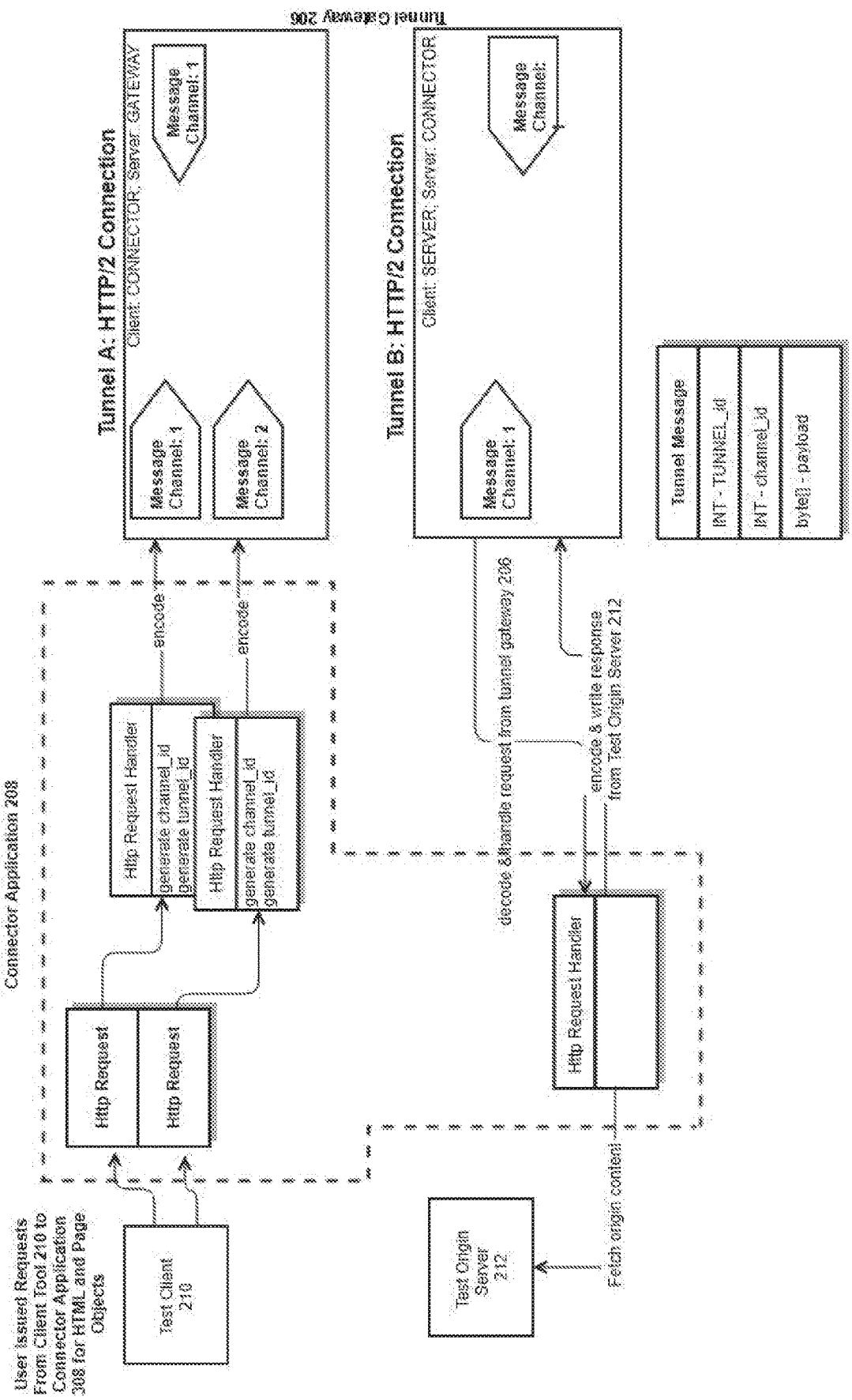

FIG. 7B depicts an alternate implementation of the tunnel. In this implementation, one tunnel is used for HTTP message exchanges in which the connector application 208 is on the client-side and the tunnel gateway 206 is on the server side, e.g., when the test client 210 is fetching content from the CDN server 220. The other tunnel is used for message exchanges in which the tunnel gateway 206 is on the client side and the connector application 208 is on the server side, e.g., when the CDN server 220 is issuing a forward request to fetch content from the test origin 212 in a proxy operation.

In this implementation, each tunnel is an HTTP/2 connection. Each endpoint of the tunnel must keep track of the tunnel identifier associated with a given message exchange, so that it knows which tunnel to use. Channel_id is still used so as to be able to multiplex multiple connections opened by the test client 210. The entity acting as the client for a given connection must generate the tunnel_id and channel_id for a given message exchange.

In other embodiments, a separate tunnel could be used for each connection opened by the test client 210.

Computer Based Implementation

The teachings hereof may be implemented using conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code, such as the "interpreter" referenced above.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 8:
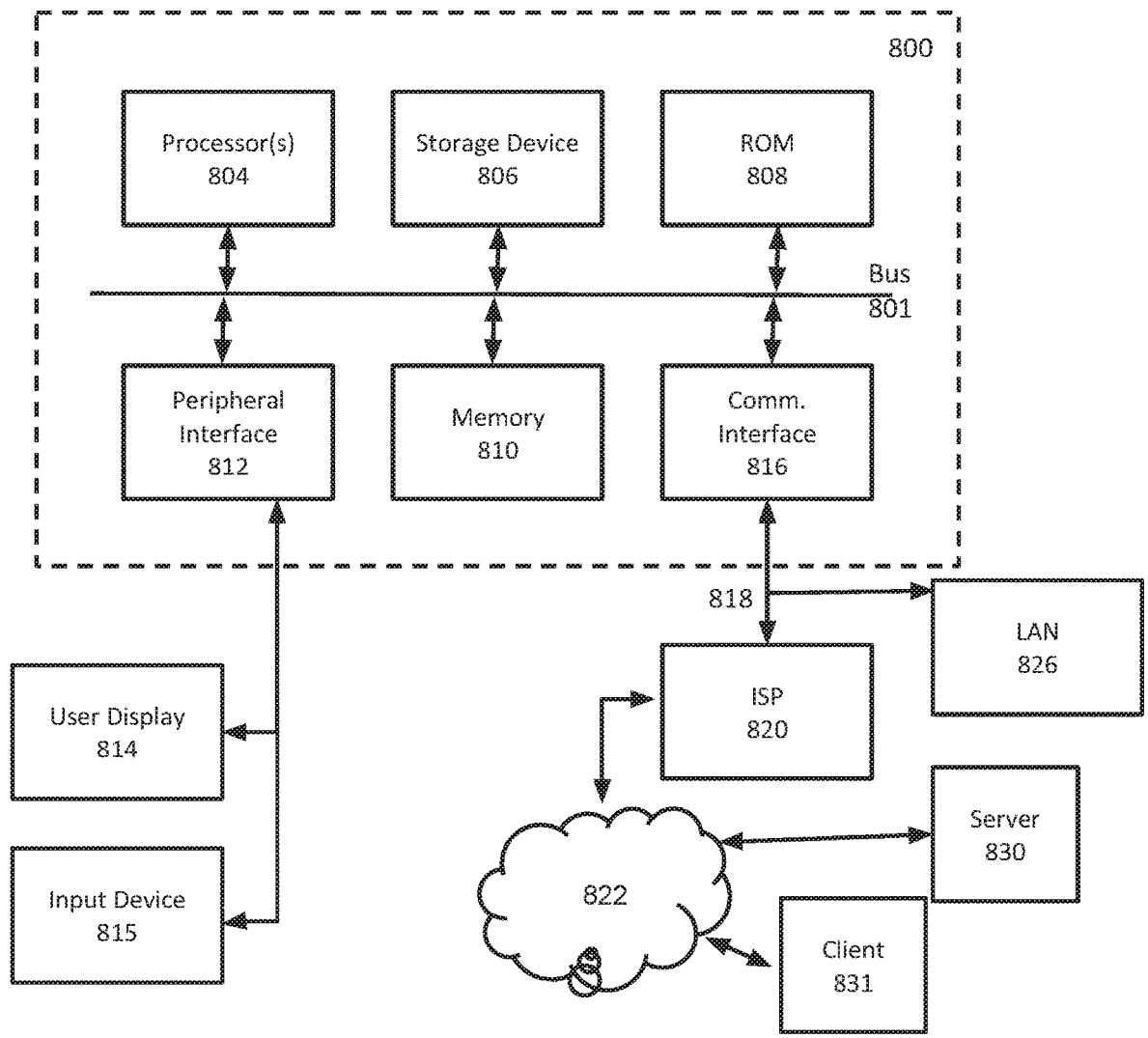
FIG. 8 is a block diagram illustrating hardware in a computer system that may be used to implement the teachings hereof.

FIG. 8 is a block diagram that illustrates hardware in a computer system 800 upon which such software may run in order to implement embodiments of the invention. The computer system 800 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 800 includes a microprocessor 804 coupled to bus 801. In some systems, multiple processor and/or processor cores may be employed. Computer system 800 further includes a main memory 810, such as a random access memory (RAM) or other storage device, coupled to the bus 801 for storing information and instructions to be executed by processor 804. A read only memory (ROM) 808 is coupled to the bus 801 for storing information and instructions for processor 804. A non-volatile storage device 806, such as a magnetic disk, solid state memory (e.g., flash memory), or optical disk, is provided and coupled to bus 801 for storing information and instructions. Other application-specific integrated circuits (ASICs), field programmable gate arrays (FPGAs) or circuitry may be included in the computer system 800 to perform functions described herein.

A peripheral interface 812 communicatively couples computer system 800 to a user display 814 that displays the output of software executing on the computer system, and an input device 815 (e.g., a keyboard, mouse, trackpad, touchscreen) that communicates user input and instructions to the computer system 800. The peripheral interface 812 may include interface circuitry, control and/or level-shifting logic for local buses such as RS-485, Universal Serial Bus (USB), IEEE 1394, or other communication links.

Computer system 800 is coupled to a communication interface 816 that provides a link (e.g., at a physical layer, data link layer,) between the system bus 801 and an external communication link. The communication interface 816 provides a network link 818. The communication interface 816 may represent a Ethernet or other network interface card (NIC), a wireless interface, modem, an optical interface, or other kind of input/output interface.

Network link 818 provides data communication through one or more networks to other devices. Such devices include other computer systems that are part of a local area network (LAN) 826. Furthermore, the network link 818 provides a link, via an internet service provider (ISP) 820, to the Internet 822. In turn, the Internet 822 may provide a link to other computing systems such as a remote server 830 and/or a remote client 831. Network link 818 and such networks may transmit data using packet-switched, circuit-switched, or other data-transmission approaches.

In operation, the computer system 800 may implement the functionality described herein as a result of the processor executing code. Such code may be read from or stored on a non-transitory computer-readable medium, such as memory 810, ROM 808, or storage device 806. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 818 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method, comprising:
    testing integration of an origin of a content provider with a content delivery network (CDN), the CDN having a plurality of servers, the CDN delivering content on behalf of the content provider, the testing comprising:
        providing a first application that runs inside an enterprise network of the content provider;
        provisioning the first application with one or more test environment identifiers (TEIs);
        establishing a persistent connection that extends from the first application, through a firewall of the enterprise network, to the CDN;
        at the first application, receiving a test request from a second application comprising a test client application inside the content provider enterprise network, and labeling said test request with a TEI corresponding to a configuration associated with the content provider;
        sending the test request labeled with the TEI to a production server in the CDN, the production server simultaneously handling production traffic for the content provider at least by delivering content on behalf of the content provider;
        with the production server, and based at least in part on the TEI, applying the configuration to the test request;
        based at least in part on the applying of the configuration and based on the TEI, the production server generating a forward request to obtain particular content necessary to respond to the test request, and directing the forward request to the first application via the persistent connection; and,
        with the first application, addressing the forward request to the origin inside the enterprise network, the origin being identified in a local configuration installed in the first application.

2. The method of claim 1, wherein the production server in the CDN determines where to address the forward request based at least in part on the TEI.

3. The method of claim 1, wherein the origin comprises a test origin of the content provider.

4. The method of claim 1, wherein the CDN stores a plurality of test configurations for the content provider, and the TEI corresponds to a particular one of said test configurations.

5. The method of claim 1, wherein the local configuration in the first application identifies the origin by at least one of: a hostname and an IP address.

6. The method of claim 1, wherein the origin comprises an origin server application running on a local machine with the test client application.

7. The method of claim 1 wherein the production CDN server caches test objects and production objects in isolation from one another.

8. A system, comprising:
- A. one or more computers associated with a content provider and located on an enterprise network behind an enterprise firewall from the Internet, the one or more computers comprising circuitry forming one or more processors and memory holding instructions for execution on the one or more processors to run a first application, a second application which comprises a test client application, and a third application which comprises an origin server application, on the one or more computers;
- B. a content delivery network (CDN), the CDN having a plurality of servers for delivering content on behalf of a content provider associated with the origin server application, the CDN comprising one or more servers deployed on the Internet and outside the enterprise firewall;
- C. the memory of the one or more computers associated with the content provider further holding instructions for execution on the one or more processors to operate the one or more computers to:
  run the first application inside an enterprise network of the content provider;
  provision the first application with one or more test environment identifiers (TEIs);
  maintain a persistent connection that extends from the first application, through a firewall of the enterprise network, to the CDN;
  at the first application, receive a test request that is, from the test client application inside the enterprise network, and labeling said test request with a TEI corresponding to a configuration associated with the content provider; and,
  send the test request labeled with the TEI to a production server in the CDN, the production server simultaneously handling production traffic for the content provider at least by delivering content on behalf of the content provider;
- D. the production server of the CDN comprising circuitry forming one or more processors and memory holding instructions for execution on the one or more processors to:
  with the production server, and based at least in part on the TEI, applying the configuration to the test request; and,
  based at least in part on the applying of the configuration and based on the TEI, the production server generating a forward request to obtain particular content necessary to respond to the test request, and directing the forward request to the first application via the persistent connection; and,
- E. the memory of the one or more computers associated with the content provider further holding instructions for execution on the one or more processors to operate the one or more computers to:
  with the first application, address the forward request to the origin server application inside the enterprise network, the origin server application being identified in a local configuration installed in the first application;
- F. the system thereby testing integration of the origin server application with the CDN.

9. The system of claim 8, wherein the production server in the CDN determines where to address the forward request based at least in part on the TEI.

10. The system of claim 8, wherein the origin server application comprises a test origin of the content provider.

11. The system of claim 8, wherein the CDN stores a plurality of test configurations for the content provider, and the TEI corresponds to a particular one of said test configurations.

12. The system of claim 8, wherein the local configuration in the first application identifies the origin server application by at least one of: a hostname and an IP address of the origin server application or the one or more computers.

13. The system of claim 8, wherein the origin server application is running on a local machine along with the test client application.

14. The system of claim 8, wherein the production server in the CDN caches test objects and production objects in isolation from one another.

* * * * *